Patented Nov. 24, 1931

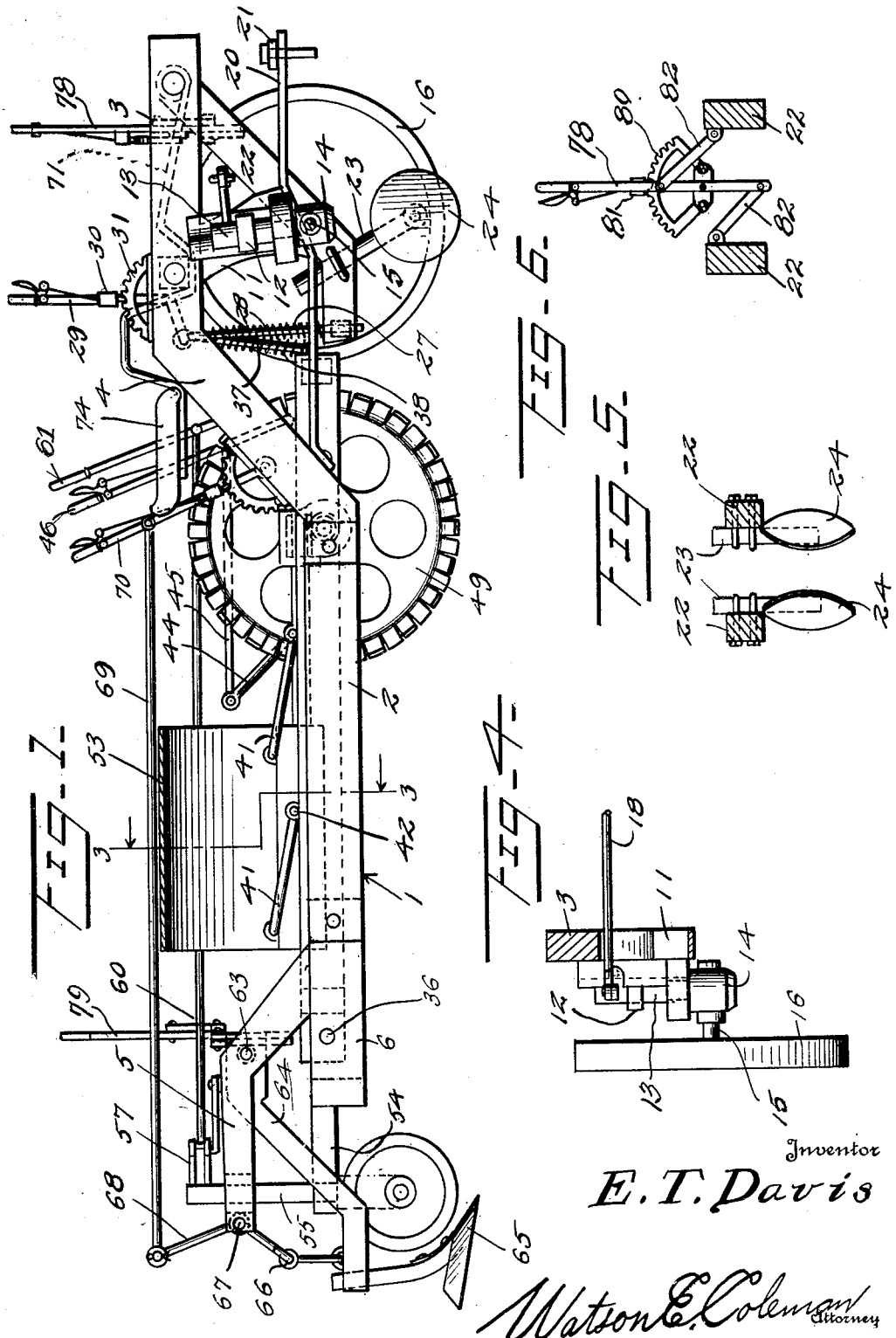

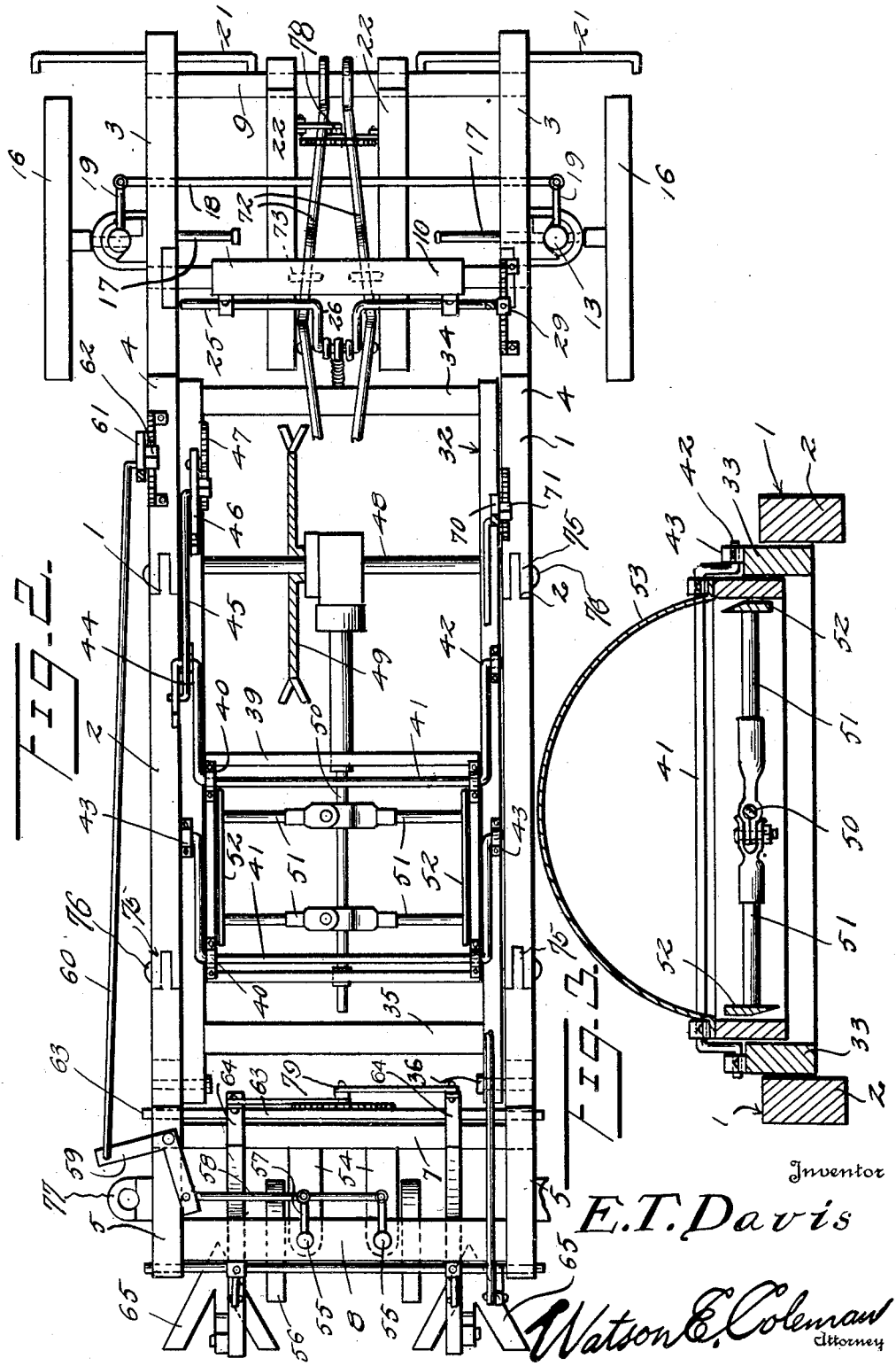

1,833,604

UNITED STATES PATENT OFFICE

EARL T. DAVIS, OF CUTHBERT, GEORGIA

COTTON CHOPPER

Application filed August 16, 1928, Serial No. 300,052. Renewed October 14, 1931.

This invention relates to a class of agricultural machinery and pertains particularly to a cotton chopping machine having associated therewith means for cutting away earth from about cotton plants previous to the chopping operation and plow devices following the choppers for center furrowing and siding up the plants.

The primary object of this invention is to provide a machine of simple construction by means of which cotton plants may be thinned out and designed to cut out a certain amount of plants at regular intervals so that the stand which is left will be properly spaced.

Another object of the invention is to provide a chopping machine having means whereby the chopping mechanism and the operating means therefor may be readily shifted to stop the chopping operation.

A still further and more important object of the invention is to provide a machine of the above described character so designed that the chopping elements may be replaced by a seeder mechanism so that the machine may be converted into a planter, the means employed for cutting away the earth from the plants previous to the chopping operation and the plows which follow the chopper acting to open and close the ground for the reception of seeds.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in side elevation of the machine embodying the present invention with a portion thereof shown in section;

Figure 2 is a top plan view of the machine with the cutter shield removed;

Figure 3 is a transverse sectional view taken upon the line 3—3 of Figure 1;

Figure 4 is a sectional view taken transversely of one side beam of the machine looking toward a front steering wheel;

Figure 5 is a sectional view taken transversely of the disk supporter arms behind the disks and looking forwardly from the same.

Figure 6 is a view in detail of the means employed for shifting the cultivator disk arms relative to one another.

Referring to the drawings in detail, it will be seen that the present machine comprises a pair of substantially parallel side beams, each indicated as a whole by the numeral 1, each of these side beams comprising a central portion 2, a raised forward portion 3 which may be substantially parallel with the central portion and connected thereto by the forwardly inclining portion 4.

Each of these side beams further comprises the upwardly and rearwardly extending arm 5 which, while in a higher plane than the central portion 2 and substantially parallel therewith, is slightly lower than the forward portion 3, as shown in Figure 1. These arms 5 project from their respective side beams inwardly of the rear ends of the same, thus leaving each beam with a rearwardly projecting portion 6.

The rearwardly projecting portions 6 of the side beams of the machine are connected by the transverse beam 7 and the free ends of the arms 5 are connected by the transverse beam 8. At the forward end of the machine, the raised forwardly extending portions 3 of the beams are connected by the spaced transverse and substantially parallel beams 9 and 10.

The beam 10 supports at each end adjacent the side beam 1 a downwardly and forwardly extending leg 11 upon the outer face of which is secured a bearing 12 in which works a spindle 13 carried by a block 14 which, in turn, is supported by the stub shaft 15 carried by the front supporting wheel 16. One of the blocks 14 carries the inwardly extending foot support 17, by means of which the attendant of the machine when riding thereon, in a manner hereinafter described, may oscillate the adjacent wheel and the wheel at the opposite side of the machine, these wheels being connected by the connecting rod 18 which couples the ends of the arms 19 carried by the spindles 13.

Extending forwardly from the under face of each of the inclined portions 4 of the beams is a draft bar 20, each of which extends beneath an adjacent leg 11, as shown in Figure 1, and terminates beneath the end of the adjacent overlying portion 3 of the side beam. Each of these draft bars carries a singletree 21 by means of which draft animals or a draft machine may be hitched to the chopper machine.

Arranged in side by side relation and supported upon the central portion of the cross beam 9 is a pair of downwardly and rearwardly extending arms 22, each of which carries upon its lower end a depending post 23, which supports a cultivator disk 24. These disks are arranged at an angle with respect to each other and so spaced that they will work upon opposite sides of a cotton row to remove earth from about the cotton plants as the machine passes thereover.

The cultivator disk supporting arms 22 are designed to be raised or lowered, pivoting about the supporting beam and this raising or lowering is accomplished through the medium of a crank shaft 25, which is mounted upon the beam 10 extending across the rear face thereof. The central portion of this shaft is formed to provide the crank 26, from which there extends downwardly a pair of bars 27, each of which connects at its lower end with the rear end of an arm 22. Each of these bars is surrounded by a coil spring 28 which acts, when the shaft 25 is held against movement, to permit slight vertical movement of the arms 22 as the disks 24 pass over irregularities in the ground, the lower ends of the bars 27 being slidably connected with their respective arms to permit slight vertical movement of the same against the expanding action of the springs 28.

The shaft 25 at one end is extended at right angles to provide an operating lever 29, this lever being provided with the usual latching mechanism 30 which coacts with a toothed segment 31 mounted upon an adjacent side beam of the machine to hold the shaft in the desired adjusted position.

Arranged between the beams 1 rearwardly of the elevator and supporting arms 22 is an elongated rectangular frame, indicated generally by the numeral 32 and comprising the side beams 33 and the cross beams 34 and 35 connecting the side beams at the front and rear ends respectively.

The frame structure 32 is of substantially the same length as the intermediate portions of the beams 2 between which it is positioned and the rear ends of the side bars 33 of this frame are pivotally secured to the main beams of the machine by the pivot pins 36. The forward end of the frame 32 is supported from the crank 26 of the shaft 25 by the bar 37, this bar being slidably connected to the frame, so that the forward end of the frame may move upward and downward thereon when the shaft 25 is fixed. The upward and downward movement of the frame 32 upon the bar 37 is opposed, however, by the spring 38, which surrounds the bar 37 bearing, like the springs 28, at its upper end against the crank 26 and at its lower end against the portion of the frame through which the supporting bar passes. It will be seen from the description thus far given that by oscillation of the lever 29, the cultivator disks 24 and the major portion of the frame 32 may be swung upwardly or downwardly, as desired.

Within the rear portion of the frame 32, there is positioned a minor frame 39, this frame being provided upon each of its side bars and adjacent each end of the same with a bearing 40 through which bearings there extends the intermediate portions of the substantially U-shaped frames 41, these portions of the frames extending transversely of the frame 39 and having the side members extending forwardly of the machine and terminating in lateral stub shafts 42, each of which has bearing in a bearing structure 43 mounted upon an adjacent side bar of the frame 32. One of the shafts 42 of one of the U-shaped frames 41 has extending upwardly therefrom an arm 44 to which is connected a link 45, which runs forwardly of the machine to a lever member 46, this lever member being pivotally mounted on or adjacent the toothed segment 47 which is supported by the frame 32, as shown in Figure 2.

It will be seen that upon oscillation of the lever 46, the frames 41 will be swung upwardly, thereby raising the frame 39 from its position within the frame 32.

Extending transversely of the forward portion of the frame 32 is a shaft 48 upon which is mounted a ground engaging wheel 49, this wheel being secured to the shaft to cause the same to rotate when the wheel 49 contacts with the ground during movement of the machine.

A suitable gear mechanism is provided for coupling the shaft 48 to a flexible shaft 50, which extends rearwardly therefrom upon the longitudinal center of the machine and through the frame 39, this flexible shaft 50 being mounted in the opposite transverse bars of this frame, as shown.

Mounted upon the shaft 50 within the frame 39 are two pairs of arms 51, each pair supporting at the outer ends thereof a knife 52. These knives are substantially parallel with the shaft 50 moving over the ground upon oscillation of the supporting shaft in a path at right angles to the path of movement of the machine. The frame 39 supports a suitable housing 53 over the knives 52 for the purpose of protecting attendants of the machine from possible injury. The arms 51 which support the knives are detachably secured upon the shaft 50, so that the same may be removed from position for replacement by a seeder mechanism, not shown, when it is desired to employ the present machine for seeding instead of the cotton chopping operation, for which it was initially designed.

Carried by and extending rearwardly from the beam 7 adjacent the central portion thereof is a pair of bearing arms 54, through each of which extends a vertical wheel spindle 55, these spindles carrying upon their lower ends caster wheels 56.

The upper ends of the spindles 55 extend through the overlying cross beam 8 and each carries at its upper end above the cross beam an arm 57 to which is pivotally connected an operating bar 58, one end of which is pivotally attached to one arm of a bell crank lever 59 pivotally mounted upon the portion 5 of an adjacent side beam 1. The other arm of the bell crank lever has connection, through the link 60, with the control lever 61 mounted upon the machine side beam adjacent the front end thereof, this lever being designed to be held in any desired adjusted position by means of the usual pawl and toothed segment structure 62.

Connecting the forward portions of the arms 5 is a supporting shaft 63 upon which is mounted a rearwardly and downwardly extending plow beam 64. Each of these plow beams supports at its rear end a center furrowing plow 65. These plows are spaced a sufficient distance apart to throw up the earth between the furrows or rows of cotton plants over which the machine is operating to cover the same after the harrow disks and chopper mechanism have performed their operations.

The beams 64 are designed for vertical swinging movement upon the supporting bar 63 and each is connected at its rear end through the medium of the link mechanism 66 with the horizontal shaft 67, which extends transversely of the arms 5, as shown in Figure 2. The connection of these links 66 with the shaft 67 is such that movement of the plow beams transversely of the machine will be permitted, so that the plows can be moved relative to one another to increase or decrease the distance therebetween.

An arm 68 is carried by the shaft 67 and this in turn is connected by the link 69 with the plow control lever 70 which is pivotally mounted upon one side beam of the machine adjacent the front thereof.

The usual pawl and toothed segment structure 71 is employed to maintain the plows in the desired adjusted position.

Suitably mounted at the forward portion of the machine, as for example, upon the beams 72, which engage at their forward ends about the transverse beam 9 and extend rearwardly through the supporting brackets 73 carried upon the beam 10, is a seat 74 for the attendant of the machine.

From the foregoing description, it will be readily seen that when the attendant of the machine is seated upon the structure 74, all of the control levers for the various moving parts will be within easy reach and that the disk supporting arms 22 and the frame structure 33 may be readily raised or lowered as desired to bring the disks and the ground engaging wheel into contact with the ground and the rear steering caster wheels 56 and plow structures 65 may be conveniently manipulated as desired. If it is desired to discontinue the chopping operation of the machine without disengaging the disks 24 from the ground, the lever 46 may be operated to raise the frame 39 upon its supporting frames 41, as will be readily understood.

It will also be appreciated that the present machine may be employed as a planter by removing the cutting blade supporting arms 51 from the shaft 50 and mounting upon the frame 39 the desired planter mechanism coupling the same with the shaft 50, so that it will be operated thereby to drop seeds into the furrow formed by the disks 24. The plows 65 following will then operate to cover or fill the furrow to complete the planting operation.

The present machine is designed to be adjusted to provide a cultivating unit in which the central frame structure 32 and its associate parts are not employed and to accomplish this, I have so constructed the side beams that the central portions 2 thereof may be removed. This is accomplished by providing the joints 75 between the ends of the central portions 2 and the forward and rear portions 3 and 5. These joints are normally maintained connected by the bolts 76. In inverting the structure, the bolts 76 are removed, thus releasing the central portions 2 which are entirely removed. The central frame structure and the structure supported thereby is then removed also and the rear of the machine is brought forwardly so that the portions of the joint 75 carried thereby may be coupled with that portion of the joint carried by the forward section 73, the bolts 76, being replaced for securing these joints.

The rearwardly extending arms 5 of the frame are each provided with a laterally extending bearing structure 77 similar to the bearing carried upon the forward portions 3. These bearings are designed to receive spindles of a stub axle structure like the stub axles and spindles 13 and 14 employed for securing the front supporting wheels to the frame. These rear spindles and axles, of course, carry traction wheels which are preferably of the same character as the wheels 16. When the foregoing adjustment is made to the frame, the caster wheels 56 may be completely removed with their associate control members and if desired a suitable substitute control employed for enabling the operator to swing the attached rear wheels of the modified structure.

To facilitate the lateral adjustment of the cultivator, disks 24 and the plow 65, I have provided for each of these units control levers 78 and 79. The control lever 78, which as shown, takes care of the adjustment of the disk cultivators 24, is suitably mounted upon the machine as for example upon the rods 72 which support the seat structure 74, there being associated with this lever the toothed segment 80 with which the shiftable latch or dog 81 for maintaining the lever in any desired adjusted position is associated. This lever 78 has connected therewith above and below the pivotal point thereof, the links 82 each of which connects with an arm 22 as shown. From this it will be readily understood that upon oscillation of the lever 78 the arms 22, which are slidably connected to the cross beam 9, will be shifted laterally of the machine to spread or draw together the cultivator disks 24.

As the operating mechanism 79, by means of which the plow beams 64 are controlled, is the same as the mechanism 78, a detailed explanation of the operation of this mechanism is believed unnecessary. The action of this lever operates to spread or draw together the plow supporting beam 64, to adjust the same to cotton rows of varying widths. This adjustment does not interfere with the connection of the links 68 with the supporting bar 67 as this connection is a slidable one as has been described.

It is believed that many advantages of the present machine will be readily appreciated because of its compactness, strong and durable but simple construction and systematic performance of the various operations involved.

Having thus described my invention, what I claim is:

1. A cotton chopping machine comprising a wheel supported frame, a second frame arranged within said supported frame, supporting members carried by the first frame for supporting the second frame, a third frame carried by the second frame, a rotary cotton chopping structure mounted in said third frame, operating means for said cotton chopping structure rotatably carried by the second frame, means for swinging said third frame into inoperative position, and means for swinging said operating means into inoperative position whereby to maintain said cotton chopping structure immobile during the movement of said first frame.

2. In a cotton chopping mechanism, a wheel supported frame structure, a second frame arranged horizontally within the supported frame, supporting members for said second frame comprising substantially U shaped members, each pivotally connected at its yoke portion to the second frame and having the end of said side member pivotally mounted in the supported frame, a third frame rotatably supported by the second frame, a chopping mechanism carried by the third frame, operating means for said chopping mechanism carried by the second frame, means for raising said U shaped members from a horizontal position to a substantially vertical position, and means for holding said operating means inoperative whereby to maintain said chopping mechanism immobile.

3. A cotton chopping machine comprising a main wheel supported frame, a second frame within the wheel supported frame, pivotal means between said second frame and the first mentioned frame permitting one end of the second frame to be swung upwardly, a third frame within said second frame, a chopping mechanism carried by and within the third frame, operating means for said chopping mechanism comprising a horizontally disposed shaft, a ground engaging member mounted on said shaft and connecting means whereby to cooperatively actuate said chopper upon rotation of said ground engaging member, means for raising the chopping mechanism carrying frame upon the second frame and maintaining the same substantially horizontal, and means for raising said ground engaging member out of engagement with the ground whereby to stop the rotation of said chopping mechanism.

4. A cotton chopping machine comprising a main wheel supported frame, a second frame within the wheel supported frame, pivotal means between said second frame and the first mentioned frame permitting one end of the second frame to be swung upwardly, a third frame within said second frame, a chopping mechanism carried by and within the third frame, operating means for said chopping mechanism comprising a horizontally disposed shaft, a ground engaging member mounted on said shaft and connecting means whereby to cooperatively actuate said chopper upon rotation of said ground engaging member, means for raising the chopping mechanism carrying frame upon the second frame and maintaining the same substantially horizontal, means for raising said ground engaging member out of engagement with the ground whereby to stop the rotation of said chopping mechanism, and adjustable plow members carried by said supported frame at the rear portion thereof.

In testimony whereof I hereunto affix my signature.

EARL T. DAVIS.